Patented Apr. 10, 1951

2,548,284

UNITED STATES PATENT OFFICE 2,548,284

PROCESS FOR PRESERVING PRUNES IN CONTAINERS

William I. Battaglia, San Jose, Calif.

No Drawing. Application March 29, 1949,
Serial No. 84,267

1 Claim. (Cl. 99—186)

The present invention is directed to, and it is an object to provide, a novel process for preserving fruit—especially prunes— in containers as a relatively dry, confection pack, with the fruit remaining soft, tasty, and natural in appearance.

Heretofore prunes have been processed and commercialized generally in two forms; i. e. dried prunes sold in bulk or packaged, or fresh preserved in containers with syrup.

In processing the dried form of prunes, they are initially dehydrated to a very low moisture content (approximately 18%), which destroys much of the texture, quality, and appearance of the fruit. Also, such dehydration has somewhat the effect of burning the prunes and their sugar content. Thereafter, before packaging, the prunes are subjected to boiling in water to replace the moisture content up to approximately 24%; this boiling further lessening the flavor and reducing the sugar content.

This form of prune must be additionally reconstituted with water and by cooking before table use.

The fresh preserved form of prunes, being in syrup, are only satisfactory for table use, and cannot be used in the manner of a confection.

It is therefore another object of this invention to provide a process, for preserving prunes in containers, which results in a delicious and attractive product which is neither fully dehydrated or fresh preserved, as above; the process including the steps of partial dehydration arrested at a predetermined stage, followed immediately by sterilization and canning under vacuum.

A further object of the invention is to provide a process, as above, which produces a preserved prune which is plump, soft, sweet, and meaty, yet preserved without benefit of a syrup; the pack—as previously indicated—being relatively dry so that the product may be conveniently handled for eating.

An additional object of the invention is to provide a process, for preserving prunes in containers, which is relatively simple and inexpensive in practice, but produces a product of high quality and flavor while retaining the food values and vitamin content to a high degree.

It is also an object of this invention to provide a process, as above, which prevents undue sugar or moisture loss from the meat of the fruit; this being a feature which makes possible the canning without syrup but in a soft, natural condition.

Another object of the invention is to produce a practical and reliable process, and one which will be exceedingly effective for the intended purpose.

These objects are accomplished by means of such process steps as will fully appear by a perusal of the following specification and claim.

Referring now more particularly to the details of the process, it comprises the following steps:

The fruit, such as prunes, selected for processing are of high grade and must be firm ripe; under-ripe or full-ripe prunes being undesirable. The selected prunes are maintained cool and fresh preparatory to subsequent handling.

At the outset the prunes are graded to remove the inferior ones, and then are subjected to an initial wash in water, followed by a hot water and mild lye dip for a brief period.

After this, the prunes are rewashed in clear water, drained, and graded for size, preferably to two or three grade sizes; each size being separately processed.

The grade sized prunes are spread upon trays and placed in a dehydrator wherein such prunes are subjected to a temperature of approximately 150° to 165° F.; the dehydrating operation being arrested by removal of the trays when the natural moisture content of the prunes is reduced to a point within the range of 30% to 40%. It will be recognized that the arresting of the dehydration, as above, results in the prunes having a substantially greater moisture content than conventional dried prunes. Also, shriveling is reduced to a minimum.

Immediately following the dehydrating operation, the prunes—on the trays—are disposed in a blancher wherein the prunes are subjected to steam for a period of from five to fifteen minutes, after a temperature of 190° in the blancher has been attained, depending on the size and type of prunes in process.

When the blanching step is complete the trays are withdrawn from the blancher and the prunes permitted to reduce in temperature for handling; the prunes, while still warm, then being packed in open-top cans to a predetermined weight.

At this stage of the process, material may be added, by placement in the cans, to impart a suggestion of flavoring to the product. Such flavoring material can be solid, pulverized or powdered spice, or fruit, such as orange, lemon, vanilla, chocolate, cinnamon, etc; the material preferably being enclosed between two small, sealed together, pieces of rice paper to facilitate handling; this paper dissolving and the flavoring material acting on the prunes thereafter.

After the cans have been packed, and the flavoring material added, as above, the packed cans are promptly carried to and placed in a retort for sterilization; the retort temperature being 210° to 212° F., and the processing time being approximately twenty minutes.

At the end of the period in the retort the packed cans of prunes are lidded or capped under vacuum; the temperature of the prunes then being approximately 185° F., and the vacuum at least seventeen pounds.

Thereafter the cans are labeled and packed in cartons for shipment.

The advantage of the above process resides in the fact that the prunes, as canned, are not dried or dehydrated prunes as generally known; this is for the reason that the dehydration process is arrested and the prunes canned while their moisture content is substantial. When a can of prunes, processed as described, is opened the fruit is moist (but not wet or syrupy), plump, meaty, attractive in appearance, and exceedingly tasty; the pack being relatively dry, which permits the prunes to be taken in the hand for eating.

It should be noted that throughout the process no moisture is added to the prunes, either by reconstituting by boiling in water, or by syrup.

From the foregoing description, it will be readily seen that there has been produced such a process as substantially fulfills the objects of the invention, as set forth herein.

While this specification sets forth the present and preferred details of the process, still in practice such deviations from such detail may be resorted to as do not form a departure from the spirit of the invention, as defined by the appended claim.

Having thus described the invention, the following is claimed as new and useful, and upon which Letters Patent are desired:

That process of preserving prunes consisting of the steps of subjecting firm ripe prunes to a dehydrating temperature of approximately 150 degrees F. to 165 degrees F. until the moisture content of the prunes is reduced to a point within the range of approximately 30% to 40% of the original moisture content thereof, steam blanching the prunes for a period of five to fifteen minutes, packing the prunes in open containers, sterilizing the prunes in the containers at an approximate temperature of 210 degrees F. to 212 degrees F., and then lidding the containers under vacuum.

WILLIAM I. BATTAGLIA.

REFERENCES CITED

The following references are of record in the file of this patent:

UNITED STATES PATENTS

| Number | Name | Date |
|---|---|---|
| 830,407 | Bowers | Sept. 4, 1906 |
| 1,380,489 | McLaughlin | June 7, 1921 |

OTHER REFERENCES

"The Swelling of Canned Prunes" by E. M. Mrah et al., Bulletin 508, February 1931, published by the University of California Printing Office, Berkeley, California, pp. 1-24 incl.